(12) United States Patent
Nakashima

(10) Patent No.: US 9,459,996 B2
(45) Date of Patent: Oct. 4, 2016

(54) CACHE DEVICE, STORAGE APPARATUS, CACHE CONTROLLING METHOD

(71) Applicant: NEC Corporation, Minato-ku, Tokyo (JP)

(72) Inventor: Toshitaka Nakashima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 7 days.

(21) Appl. No.: 14/670,706

(22) Filed: Mar. 27, 2015

(65) Prior Publication Data

US 2015/0278000 A1    Oct. 1, 2015

(30) Foreign Application Priority Data

Mar. 31, 2014  (JP) ................................. 2014-073013

(51) Int. Cl.
| | |
|---|---|
| *G06F 11/00* | (2006.01) |
| *G06F 12/00* | (2006.01) |
| *G06F 11/07* | (2006.01) |

(52) U.S. Cl.
CPC ............. *G06F 12/00* (2013.01); *G06F 11/073* (2013.01); *G06F 11/0757* (2013.01)

(58) Field of Classification Search
USPC ........................................................ 714/47.1
See application file for complete search history.

(56) References Cited

U.S. PATENT DOCUMENTS

| | | | |
|---|---|---|---|
| 6,243,795 B1 | 6/2001 | Yang et al. | |
| 2008/0010557 A1* | 1/2008 | Kume | ................... G06F 11/008 714/47.2 |
| 2008/0034156 A1 | 2/2008 | Kawaguchi et al. | |
| 2009/0249129 A1* | 10/2009 | Femia | ................... G06F 11/008 714/47.2 |
| 2009/0265507 A1 | 10/2009 | Jibbe et al. | |
| 2010/0057988 A1 | 3/2010 | Okamoto et al. | |

FOREIGN PATENT DOCUMENTS

| | | |
|---|---|---|
| JP | 2008040713 A | 2/2008 |
| JP | 2010-055247 A | 3/2010 |
| JP | 2013-047965 A | 3/2013 |

OTHER PUBLICATIONS

Japanese Office Action for JP Application No. 2014-073013 mailed on Mar. 8, 2016 with English Translation.

* cited by examiner

*Primary Examiner* — Sarai Butler

(57) ABSTRACT

Provided is a cache device which can minimize probability of data loss in a storage device in which write data and read data are separately cached.
The cache device includes a write cache including a first storing unit that temporarily stores write data to be written in external storage devices and is predicted that a failure occurs at the first time and a second storing unit that temporarily stores the write data and is predicted that a failure occurs at the second time being later than the first time by a predetermined failure handling time or more, and a read cache including a third storing unit that temporarily stores read data to be read from the external storage devices.

10 Claims, 3 Drawing Sheets

Fig.2A  TIME COURSE OF THE NUMBER OF REMAINING WRITE TIMES OF HIGH-SPEED STORING MEANS A
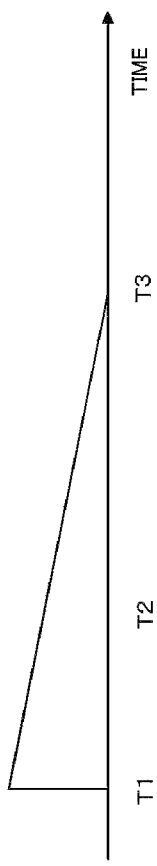
Fig.2B  TIME COURSE OF THE NUMBER OF REMAINING WRITE TIMES OF HIGH-SPEED STORING MEANS B
Fig.2C  TIME COURSE OF FAILURE SITUATION OF CACHE
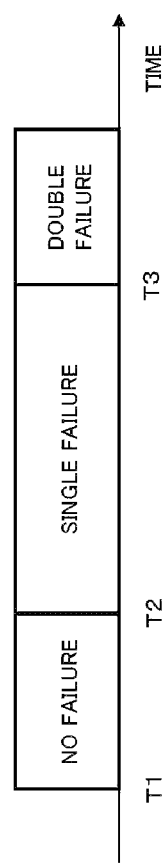

CACHE DEVICE, STORAGE APPARATUS, CACHE CONTROLLING METHOD

This application is based upon and claims the benefit of priority from Japanese Patent Application No. 2014-073013, filed on Mar. 31, 2014, the disclosure of which is incorporated herein in its entirety by reference.

TECHNICAL FIELD

The present invention relates to a cache device, a storage apparatus, and a cache controlling method, which are able to decrease probability of data loss.

BACKGROUND ART

RAID (Redundant Arrays of Inexpensive Disks), etc. is known, as a method of improving failure resistance by increasing redundancy of data stored in a storage device. In RAID, since the same data is written in a plurality of disks, the data can be restored when one or more disks of the plurality of disks break down.

Read/write of data from/to a disk can be performed through a read cache and a write cache which utilize SSD (Solid State Drive), like a flash memory, which runs faster than the disk, in order to improve response performance of a storage system.

When the read cache stores the latest data, on reception of a data reading request, the read cache sends back the data on the read cache without reading the data from the disk. When the read cache does not store the latest data, on reception of the data reading request, the read cache reads out the data from the disk to the read cache, and sends back the data.

On reception of a data writing request, the write cache updates data on the write cache without writing the data into the disk, and sends back an acknowledgement of the request. The write cache writes the data in the disk later collectively.

A flash memory which is frequently used as a cache of a storage system is a storing medium which has an upper limit of the number of times of data writing. In the storage system employing the flash memory as the cache, it is necessary to give attention to availability of the flash memory.

PTL 1 discloses one example of a technology improving availability of the storage system including a plurality of caches with the flash memory.

In the storage system of PTL 1, a pair of media on which mirroring is performed is initially chosen. Next the storage system acquires information on the number of remaining writable times of each of the media. The storage system chooses the medium which has the shortest number of remaining writable times and the medium which has the second shortest number of remaining writable times, as exchange candidate media, and calculates a difference between the numbers of remaining writable times of the two media (the numbers of remaining writable times difference). If the remaining writable times difference is less than a predetermined threshold value, the storage system chooses a pair of one of the exchange candidate media and an auxiliary medium in which the numbers of remaining writable times difference therebetween is the predetermined threshold value or more. Finally the storage system replaces the auxiliary medium with the exchange candidate medium which is not chosen as the pair to make a new pair of media on which mirroring is performed.

As the result of the above operations, in the storage system of PTL 1, writing can be performed for at least predetermined threshold period of time, until the number of remaining writable times of one of the pair of media to which mirroring is performed becomes zero (double failure occurs) after the number of remaining writable times of one of the pair of media becomes zero (single failure occurs). Therefore, the period of time until the double failure occurs after the single failure occurs is kept to be the predetermined threshold value or more.

CITATION LIST

Patent Literature

[PTL 1] Japanese Patent Application Laid-Open No. 2008-040713 (pp. 17-18, FIG. 11)

SUMMARY

Technical Problem

In the storage system of PTL 1, the medium is shared in data read/write.

In order to further improve the response performance, or in order to improve the failure resistance, a data reading cache and a data writing cache can be separately arranged. If the data reading cache and the data writing cache are separated, a degree of reliability required for the caches which have different uses is different.

For example, if written data which is cached is lost due to failure of the writing cache, data which is not yet written in a storage device is lost. Ordinarily, a risk of data loss is decreased if a plurality of caches is made redundant by using RAID. Even though the caches are made redundant, data loss occurs if multiple failures of the caches occur.

Even though cached readout data is lost due to failure of the reading cache, data loss does not occur since the same data is stored in the storage device.

Reliability of the cache which is required for avoiding data loss is different between the writing cache and the reading cache.

In the technology of PTL 1, the reading medium is not distinguished from the writing medium. The technology of PTL 1 does not consider the circumstance that required reliability is different between the reading medium and the writing medium. Even though the reading medium is not distinguished from the writing medium, reliability of the pair of media which is shared in data read/write can be improved as a whole.

However, if the reading medium and the writing medium are distinguished from each other and are separately improved, total reliability can be improved. The technology of PTL 1 has room for further decreasing probability of data loss in the storage device in which writing and reading are separately cached.

OBJECT OF THE INVENTION

An object of the invention is to provide a cache device, a storage apparatus, and a cache controlling method, which can minimize probability of data loss in a storage apparatus in which write data and read data are separately cached.

Solution to Problem

The cache device of the invention includes,
a write cache including a first storing unit that temporarily stores write data to be written in external storage devices, and is predicted that a failure occurs at the first time; and a second storing unit that temporarily stores the write data, and is predicted that a failure occurs at the second time being later than the first time by a predetermined failure handling time or more, and a read cache including a third storing unit that temporarily stores read data to be read from the external storage devices.

The storage apparatus of the invention includes, storage devices, and a cache device including a write cache including a first storing unit that temporarily stores write data to be written in external storage devices and is predicted that a failure occurs at the first time, and second storing unit that temporarily stores the write data and is predicted that a failure occurs at the second time being later than the first time by a predetermined failure handling time or more, and a read cache including a third storing unit that temporarily stores read data to be read from the storage devices.

A cache controlling method of the invention includes, controlling a write cache by using first storing unit that temporarily stores write data to be written in external storage devices and is predicted that a failure occurs at the first time and second storing unit that temporarily stores the write data and is predicted that a failure occurs at the second time being later than the first time by a predetermined failure handling time or more, and controlling a read cache by using a third storing unit that temporarily stores read data to be read from the storage devices.

Advantageous Effects of Invention

The invention includes an advantageous effect that probability of data loss can be minimized in the storage apparatus in which write data and read data are separately cached.

EXEMPLARY EMBODIMENT

Figure 1:
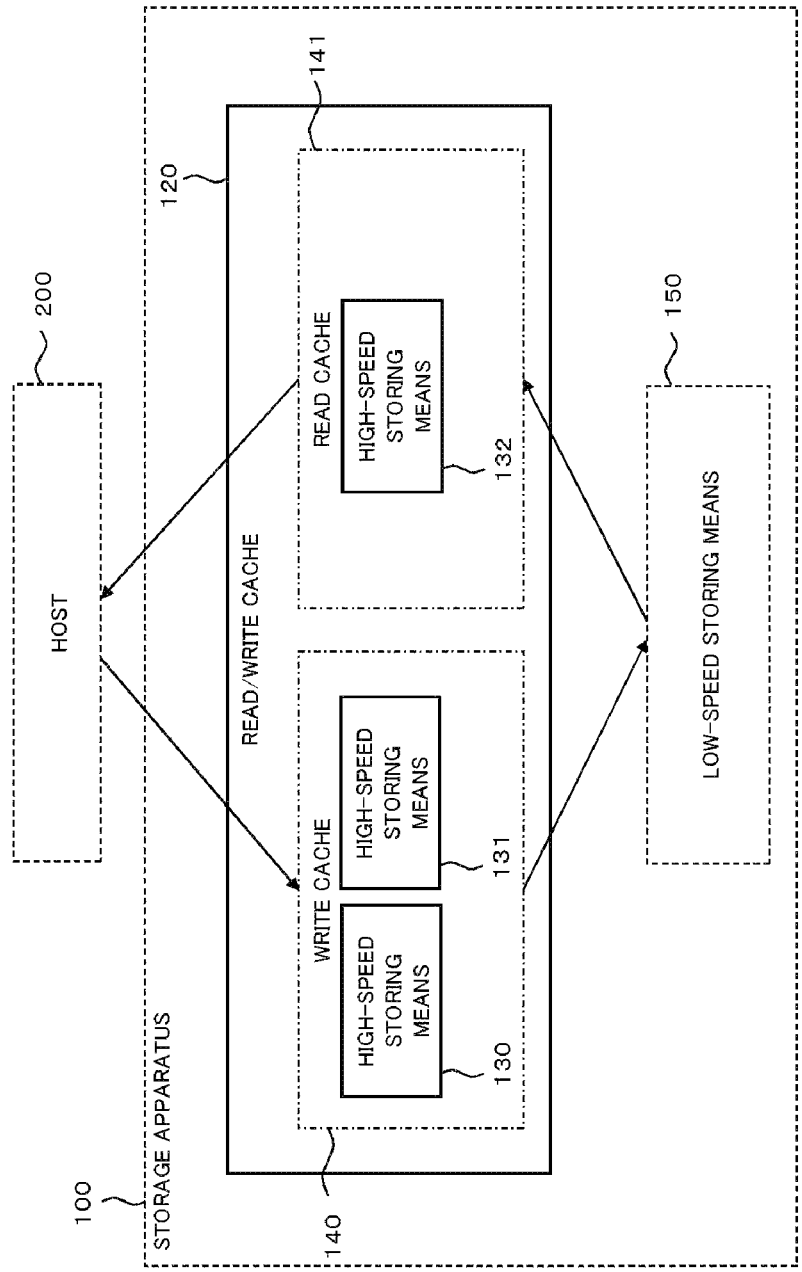
FIG. 1 a block diagram illustrating one example of a configuration of a read/write cache of a first embodiment of the invention, FIG. 2A a diagram explaining a specific example of time course of the number of remaining writable times of a high-speed storing means A of the embodiment, FIG. 2B a diagram explaining a specific example of time course of the number of remaining writable times of a high-speed storing means B of the embodiment, FIG. 2C a diagram explaining a specific example of time course of a failure situation of a cache having high-speed storing means A, B of the embodiment, FIG. 3 a block diagram illustrating one example of a configuration of a storage device of a second embodiment of the invention.

Embodiments of the invention are described in detail by referring to drawings. In the drawings, the same component has the same sign, and explanations thereof are optionally omitted.

First Embodiment

A configuration of the embodiment is described.

FIG. 1 is a block diagram illustrating one example of a configuration of a read/write cache 120 of the embodiment.

An external storage apparatus 100 includes the read/write cache 120 and a low-speed storing means 150. The low-speed storing means 150 is a device which stores data, like HDD (Hard Disk Drive). The read/write cache 120 includes high-speed storing means, like SSD, with excellent IO (Input/Output) performance compared with the low-speed storing means 150.

The read/write cache 120 includes a write cache 140 and a read cache 141.

The write cache 140 is a data write cache for the low-speed storing means 150. In the write cache 140, high-speed storing means 130, 131 are made redundant by using RAID 1 or RAID 6. The write cache 140 is a virtual group and the high-speed storing means included therein are changeable.

The read cache 141 is a data read cache for the low-speed storing means 150 and includes a high-speed storing means 132. The read cache 141 is a virtual group and the high-speed storing means included therein are changeable. The read cache 141 may include another high-speed storing means. A plurality of the high-speed storing means included in the read cache 141 may be made redundant by using RAID 1 or RAID 6.

The high-speed storing means is a device which initially has the number of predetermined maximum writable times, and in which the number of remaining writable times is decreased depending on an amount of data written in the high-speed storing means (hereinafter referred to as "the number of remaining writable times"). The high-speed storing means is a device having an upper limit of the number of predetermined write times, like a SSD.

The number of remaining writable times of each of the high-speed storing means 130, 131 and 132 is always held. For example, each of the high-speed storing means 130, 131, and 132 initially sets the number of initial writable times, as the number of remaining writable times, and subtracts the number of written times from the number of remaining writable times when actual writing into the high-speed storing means is performed.

On the basis of the number of remaining writable times of each of the high-speed storing means, the high-speed storing means included in each of the write cache 140 and the read cache 141 is determined.

In the high-speed storing means 130, 131, and 132, the write cache 140 includes the high-speed storing means with the number of maximum remaining writable times and the high-speed storing means with the number of minimum remaining writable times, and the read cache 141 includes the high-speed storing means with the number of intermediate remaining writable times.

Next, operations of the embodiment are described.

FIG. 2 is a diagram explaining operations of the read/write cache 120 of the embodiment. FIG. 2A illustrates a specific example of time course of the number of remaining writable times of a high-speed storing means A of the embodiment. FIG. 2B illustrates a specific example of time course of the number of remaining writable times of a high-speed storing means B of the embodiment. FIG. 2C illustrates a specific example of time course of a failure situation of a cache having high-speed storing means A, B of the embodiment.

In the high-speed storing means A, the number of remaining writable times is decreased from the time T1 to the time T3 (T1, T2, T3 are positive real numbers) and becomes zero at the time T3 (FIG. 2A).

In the high-speed storing means B, the number of remaining writable times is decreased from the time T1 to the time T2, and becomes zero at the time T2 (FIG. 2B).

Since high-speed storing means A, B make a duplicated write cache, the same amount of data is written in each of the high-speed storing means A, B. The number of remaining writable times of each of the high-speed storing means A, B is decreased at the same speed.

A failure does not occur from the time T1 to the time T2 in the duplicated cache including the high-speed storing means A, B. A failure occurs at the time T2 in the high-speed storing means B. Then, the write cache becomes a single failure state. A failure further occurs at at the time T3 in the high-speed storing means A. Then, the write cache becomes a double failure state (FIG. 2C).

In the read cache 141, even though cached read data is lost due to the failure of the high-speed storing means 132, the same read data is stored in the low-speed storing means 150. Therefore data loss does not occur. In the write cache 140, if cached write data is lost due to the double failure of the high-speed storing means 130, 131, data loss occurs.

A user notices failure occurrence in the high-speed storing means B at the time T2, and can cope with the failure occurrence from the time T2 to the time T3 when the double failure may occur, without data loss. For example, the user may replace the failed high-speed storing means B.

A period of time from the time T2 to the time T3 when the failed high-speed storing means B can be replaced (hereinafter referred to as "failure repairable time") becomes long, as difference of the numbers of remaining writable times between the high-speed storing means A, B becomes large. It is significant to widen a time interval between failure occurrences in the high-speed storing means A, B. When the write cache 140 includes the high-speed storing means with the number of maximum remaining writable times and the high-speed storing means with the number of minimum remaining writable times and the read cache 141 includes the high-speed storing means with the number of intermediate remaining writable times, the failure repairable time is maximized. If a failure actually occurs, the failed high-speed storing means has to be repaired in a shorter time interval than the failure repairable time.

As described above, in the read/write cache 120 of the embodiment, the write cache 140 includes two high-speed storing means in which difference of the number of remaining writable times therebetween is maximized. Therefore the failure repairable time is maximized. In the read/write cache 120 of the embodiment, therefore, probability of data loss can be minimized in the storage apparatus in which write data and read data are separately cached.

In the embodiment, the write cache includes two high-speed storing means 130, 131, and the read cache includes one high-speed storing means 132. The number of the high-speed storing means which is included in the write cache 140 is not necessarily limited to two. The number of the high-speed storing means of the embodiment may be more than two. In this case, it is preferable that the write cache 140 includes the high-speed storing means with the number of maximum remaining writable times and the high-speed storing means with the number of minimum remaining writable times. The high-speed storing means except the two high-speed storing means having the number of maximum remaining writable times and the number of minimum remaining writable times may be included in either the read cache 141 or the write cache 140.

As described above, when the number of the high-speed storing means is more than two, it is preferable that the write cache 140 includes the high-speed storing means with the number of maximum remaining writable times and the high-speed storing means with the number of minimum remaining writable times. Even though the write cache 140 does not include both of the high-speed storing means above described, a certain degree of effect can be acquired if the failure handling time required for a given countermeasure, like repairs at failure, is set as a requirement. When the failure handling time is given, the write cache 140 may include two high-speed storing means so that the shortest failure time interval is the failure handling time or more, on the basis of the difference of the remaining writable times. In this case, though the failure handling time is not maximized, failure occurrence can be handled without difficulties since the failure handling time is shorter than the failure time interval.

In the embodiment, the number of remaining writable times for each high-speed storing means is held. However, an item which is held for each high-speed storing means in the embodiment is not limited to the number of remaining writable times for each high-speed storing means. The item which is held for each high-speed storing means in the embodiment may be an arbitrary item which can be used for estimation of a failure occurrence time (hereinafter referred to as "failure index"). The number of remaining writable times is decreased as writing is repeated. It is recognized that failure occurs when the number of remaining writable times becomes zero. Therefore, the number of remaining writable times can be one example of the failure index.

In the embodiment above described, a combination of the high-speed storing means which are included in each of the write cache and the read cache of the read/write cache is determined once. However the high-speed storing means in the read/write cache of the embodiment may be repeatedly determined by the write cache 140 or the read cache 141, and may be replaced with another high-speed storing means as necessary. The high-speed storing means in the read/write cache of the embodiment may be repeatedly determined by the read/write cache 120, and may be replaced with another high-speed storing means as necessary. The high-speed storing means in the read/write cache of the embodiment may be repeatedly determined and may be replaced with another high-speed storing means by control means (not shown) included in the external storage apparatus, as necessary.

In the embodiment, the high-speed storing means holds the number of remaining write times. The number of remaining write times for each high-speed storing means of the embodiment may be held by the write cache 140 or the read cache 141 including the high-speed storing means. The number of remaining write times for each high-speed storing means of the embodiment may be held by the read/write cache 120. The number of remaining write times for each high-speed storing means of the embodiment may be held by a counting means (not shown) included in the external storage apparatus.

Second Embodiment

As an example of the read/write cache 120 of the invention, a second embodiment is shown, which has a storage apparatus in which a writing error rate of a SSD, as a high-speed storing means, is count, instead of the number of remaining writable times held in each high-speed storing means in the first embodiment. The writing error rate is one example of the failure index.

A configuration of the embodiment is described.

Figure 3:
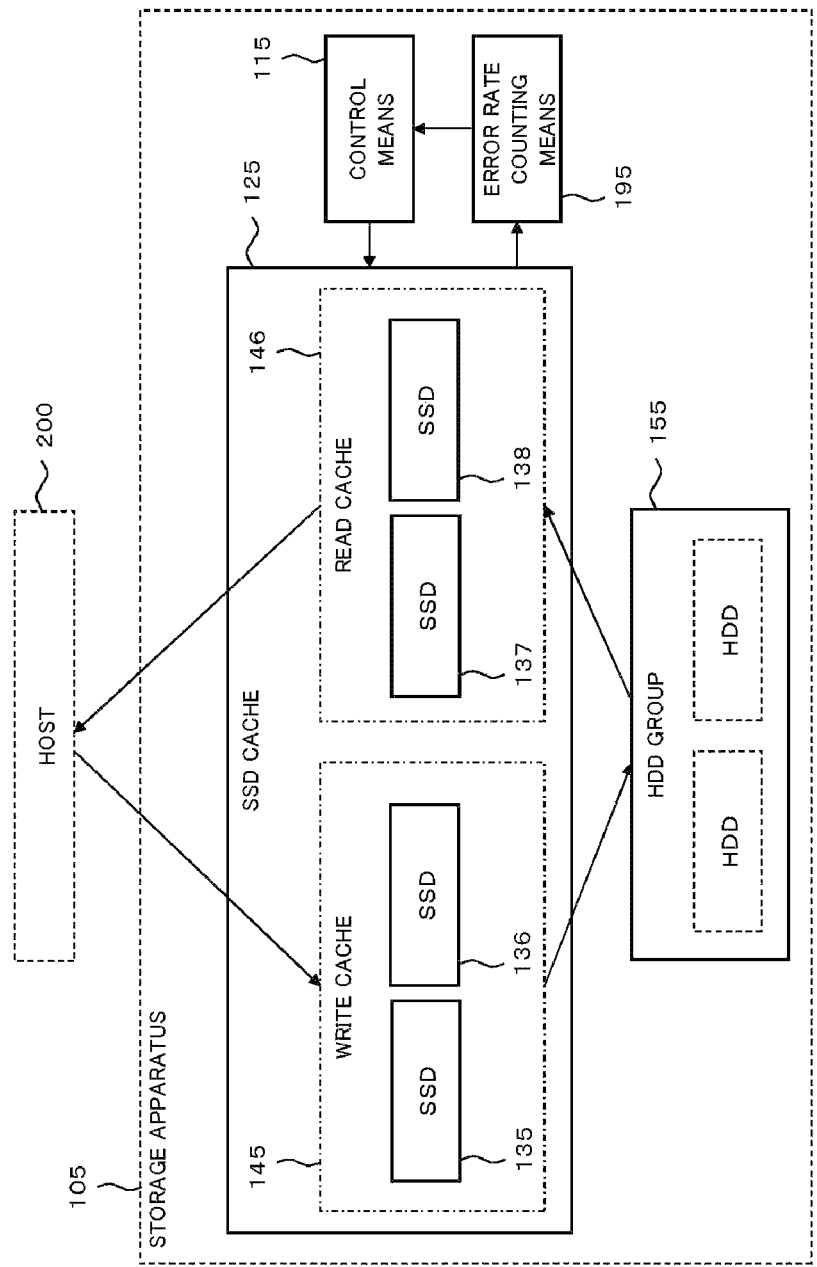

FIG. 3 is a block diagram illustrating one example of a configuration of a storage apparatus 105 of the embodiment.

The storage apparatus 105 includes a HDD group 155 storing data, a SSD cache 125 including a SSD with excellent IO performance compared with a HDD, an error rate counting means 195, and a control means 115.

The SSD cache 125 includes a write cache 145 and a read cache 146.

The write cache 145 includes a SSD group for data write cache of the HDD group 155, in which SSDs 135, 136 are made redundant by using RAID 1. The write cache 145 is a virtual SSD group and the SSD included therein is changeable.

The read cache 146 includes a SSD group for data read cache of the HDD group 155, in which SSDs 137, 138 are made redundant by using RAID 1. The read cache 146 is a virtual SSD group and the SSD included therein is changeable.

The SSD is a device that has the number of predetermined writable times initially and the number of remaining writable times is decreased depending on the number of written times in the SSD. The SSD is controlled so that positions in which data is written are distributed in the memory. Therefore if the number of remaining writable times is decreased, the writing error rate is increased.

The error rate counting means 195 holds the error rate of each of SSDs 135, 136, 137 and 138. The error rate counting means 195 holds an error rate for each SSD. "Error rate" is a ratio of the number of writing error occurrences to the total number of trials of recent data writing. The writing error occurrence can be detected using statistical data collected in the SSD.

The control means 115 replaces the SSDs included in the write cache 145 and the read cache 146, in order of the error rate of each SSD.

The other elements are the same as those of the first embodiment.

The storage apparatus 105 may include a CPU (Central Processing Unit) and storing means therein. The CPU may constitute the control means by carrying out programs stored in the storing means.

Next, operations of the embodiment are described.

The error rate counting means 195 counts the error rate for each SSD when an error occurs in SSDs 135, 136, 137 and 138. Operations of the control means 115 are activated at predetermined timing.

The control means 115 confirms the error rate for each SSD of the error rate counting means 195, ranks the SSD having the largest error rate as the first, and ranks the other SSDs.

The control means 115 makes the write cache 145 using the SSDs which are ranked first and fourth, and makes the read cache using the SSDs which are ranked second and third. The reason why the write cache 145 and the read cache 146 includes such combinations of the SSDs is described below.

Suppose that error rates of four SSDs are p1, p2, p3 and p4 (p1, p2, p3, p4 are real numbers). The error rate is defined based on the number of errors which occur in a predetermined period of time. It is assumed that the four error rates are in the relation of p1<p2<p3<p4.

In each SSD, time periods until first failure occurrence T1, T2, T3, T4 (T1, T2, T3, T4 are real numbers) are T1>T2>T3>T4, on average.

If SSDs with error rates p1, p4 are chosen, there is high probability that the SSD with the error rate p4 initially fails and the SSD with the error rate p1 finally fails. Therefore, when the SSDs with error rates p1, p4 are chosen, the time interval between failure occurrences is expected to be the longest on average.

In the embodiment, if the write cache 145 includes the SSDs whose error rates are ranked first and fourth, failure occurrence interval of the high-speed storing means is expected to be the largest.

As described above, in the storage apparatus 105, the write cache 145 includes the SSDs in which the difference of error rates therebetween is maximized. The failure repairable time is therefore expected to be maximized. In the storage apparatus 105 of the embodiment, probability of data loss is minimized in the storage apparatus in which the write data and the read data are separately cached.

In the read/write cache 120 of the first embodiment, the number of remaining writable times has to be counted. In the storage apparatus 105 of the embodiment, it is not necessary to count the number of remaining writable times for each SSD, since the error rate for each SSD has only to be collected. Therefore, in the storage apparatus 105 of the invention the SSDs are easily managed.

In the embodiment, the SSD cache 125 is constituted by using RAID 1. However, a level of the RAID constituting the SSD cache of the embodiment is not limited to the RAID 1. The level of the RAID constituting the SSD cache of the embodiment may be a different RAID level (RAID 6, etc.).

In the embodiment, the high-speed storing means is SSD. However the high-speed storing means of the embodiment is not limited to the SSD. The high-speed storing means of the embodiment may be semiconductor memory, a HDD, or a similar data storing means.

Each operation of the control means 115, etc. of the storage apparatus in FIG. 3 may be carried out by software. Computer programs for executing each operation may be read and carried out by a CPU included in the storage apparatus. When the operations are carried out by the programs, the operations of the above described embodiments can be performed. The programs may be stored in a semiconductor storage device, like a ROM (Read Only Memory), a RAM (Random Access Memory) or a flash memory, or a non-transitory medium, like an optical disk, a magnetic disk or a magneto-optical disk.

The operation may be carried out by a component of a discrete circuit.

The invention of the present application is not limited to the above mentioned embodiments, and various changes can be made within the scope of the invention of the present application. (Further exemplary embodiment 1) A cache controlling program for causing a computer included in a cache device having a first storing means including a first time when a failure occurrence is predicted, second storing means including a second time when a failure occurrence is predicted, the second time being later than the first time by a predetermined failure handling time or more, and a third storing means to operate as a write cache means for temporarily storing write data to be written in external storage devices by using the first storing means and the second storing means, and as a read cache means for temporarily storing read data to be read from the storage devices by using the third storing means.

The invention claimed is:
1. A cache device, comprising:
a write cache comprising:
a first storing unit that temporarily stores write data to be written in external storage devices and is predicted that a failure occurs at the first time; and a second storing unit that temporarily stores the write data and is predicted that a failure occurs at the second time, the second time being later than the first time by a predetermined failure handling time or more;

and a read cache including a third storing unit that temporarily stores read data to be read from the external storage devices.

2. The cache device of claim 1, wherein the first time is predicted by using the number of remaining writable times of the first storing unit and the second time is predicted by using the number of remaining writable times of the second storing unit.

3. The cache device of claim 2, wherein the write cache holds the number of first remaining writable times of the first storing unit and the number of second remaining writable times of the second storing unit, and the write cache is changed to include two storing units in which a time interval between the times when failure occurrences therein are predicted is the failure handling time or more, on the basis of the number of first remaining writable times and the number of second remaining writable times.

4. The cache device of claim 2, wherein the write cache is configured by using the storing unit having the smallest number of remaining writable times and the storing unit having the largest number of remaining writable times of three or more storing units.

5. The cache device of claim 1, wherein the first time is predicted by using an error rate of the first storing unit and the second time is predicted by using an error rate of the second storing unit.

6. The cache device of claim 5, wherein the write cache holds a first error rate of the first storing unit and a second error rate of the second storing unit, and the write cache is changed to include two storing units in which a time interval between the times when failure occurrences therein are predicted is the failure handling time or more, on the basis of the first error rate and the second error rate.

7. The cache device of claim 5, wherein the write cache is configured by using the storing unit having the highest error rate and the storing unit having the lowest error rate of three or more storing units.

8. A storage apparatus comprising:

storage devices: and a cache device comprising:

a write cache comprising:

a first storing unit that temporarily stores write data to be written in the storage devices and is predicted that a failure occurs at the first time; and a second storing unit that temporarily stores the write data and is predicted that a failure occurs at the second time, the second time being later than the first time by a predetermined failure handling time or more; and a read cache comprising a third storing unit that temporarily stores read data to be read from the storage devices.

9. A cache controlling method, comprising:

controlling a write cache by using a first storing unit that temporarily stores write data to be written in external storage devices and is predicted that a failure occurs at the first time; and a second storing unit that temporarily stores the write data and is predicted that a failure occurs at the second time, the second time being later than the first time by a predetermined failure handling time or more; and controlling a read cache by using a third storing unit that temporarily stores read data to be read from the storage devices.

10. The cache device of claim 3, wherein the write cache is configured by using the storing unit having the smallest number of remaining writable times and the storing unit having the largest number of remaining writable times of three or more storing units.

* * * * *